Oct. 4, 1949.   R. W. WASHINGTON   2,483,949
PERIODIC ROTARY METERING AND DISTRIBUTING VALVE
Filed Oct. 6, 1943   4 Sheets-Sheet 1

Inventor
Robert W. Washington
By Clarence A. O'Brien
and Harvey B. Jacobson
Attorneys Oct. 4, 1949.                R. W. WASHINGTON                2,483,949
                  PERIODIC ROTARY METERING AND DISTRIBUTING VALVE
Filed Oct. 6, 1943                                      4 Sheets-Sheet 2

Inventor
Robert W. Washington

By Clarence A. O'Brien
and Harvey B. Jacobson
Attorneys

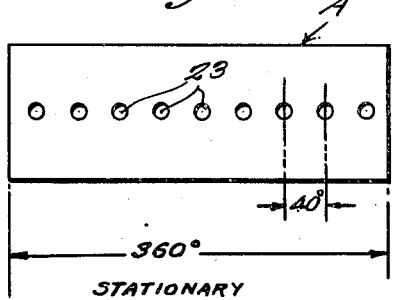
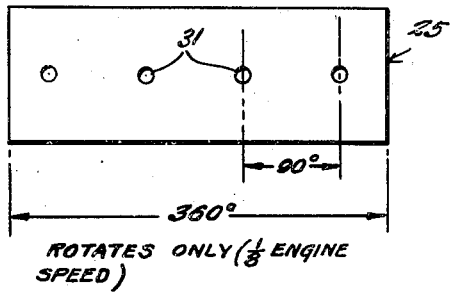
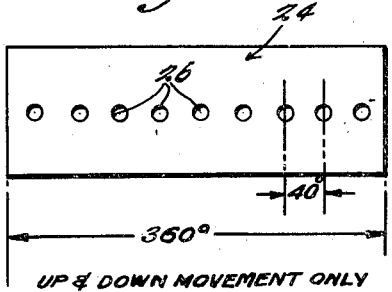
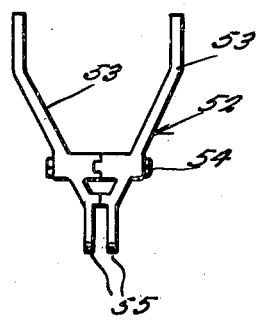
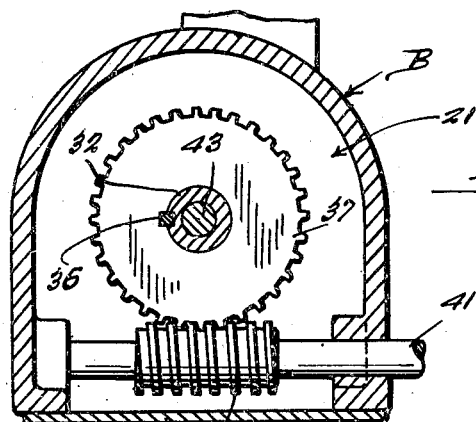

SINGLE SERIES OF 6 HOLES IN STATIONARY CASING

FOUR SERIES OF 6 HOLES, ROTATES ONLY 1/6 OF ENGINE SPEED

SINGLE SERIES OF 6 HOLES IN THROTTLE CONTROL DISC UP & DOWN MOVEMENT ONLY

Patented Oct. 4, 1949

2,483,949

UNITED STATES PATENT OFFICE 2,483,949

PERIODIC ROTARY METERING AND DISTRIBUTING VALVE

Robert W. Washington, Blue Island, Ill.

Application October 6, 1943, Serial No. 505,255

8 Claims. (Cl. 137—146)

This invention relates to certain new and useful improvements in a periodic valve which is expressly constructed to meter and distribute said fuel so that a predetermined variable amount may be fed into each cylinder of an internal combustion engine.

More specifically, my invention appertains to a periodic fuel distributing valve for virtually all types of internal combustion engines, and has reference in particular to a novel adaptation and structural arrangement which is equally and well adapted to Diesel and gasoline engines with or without electric ignition, the preferred embodiment of the invention being so designed as to automatically meter a predetermined exact amount of fuel for injection in a single shot or in intermittent series of shots to each cylinder as may be required for maximum efficiency, combustion and power.

I further have in mind a structure whose parts have been carefully chosen and structurally coordinated to insure a uniform supply of fuel to each cylinder. It follows, too, that uniformity of injection will likewise insure each cylinder its predetermined and properly rated amount of work, the result being equal force applied to bearings and shafts, longer life of parts, a minimum of vibration and higher thermal efficiency in operation.

Other features and advantages of the invention will become more readily apparent from the following description and accompanying illustrative drawings.

In the drawings, wherein like numerals are employed to designate like elements and parts throughout the various views.

Figure 1:
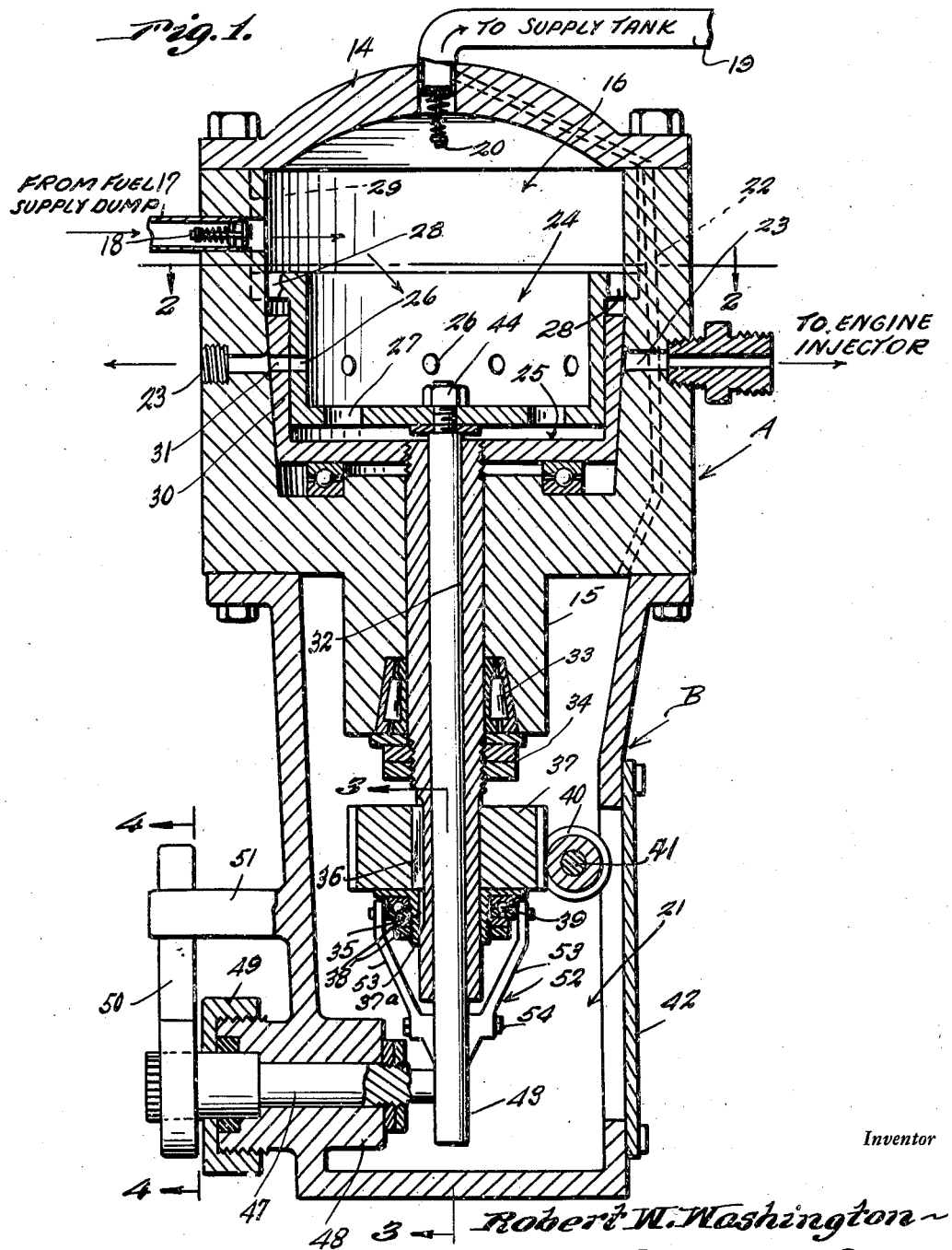
Figure 1 is a view, partly in section and partly in elevation, showing my improved periodic rotary metering and distributing valve.
Figure 2:
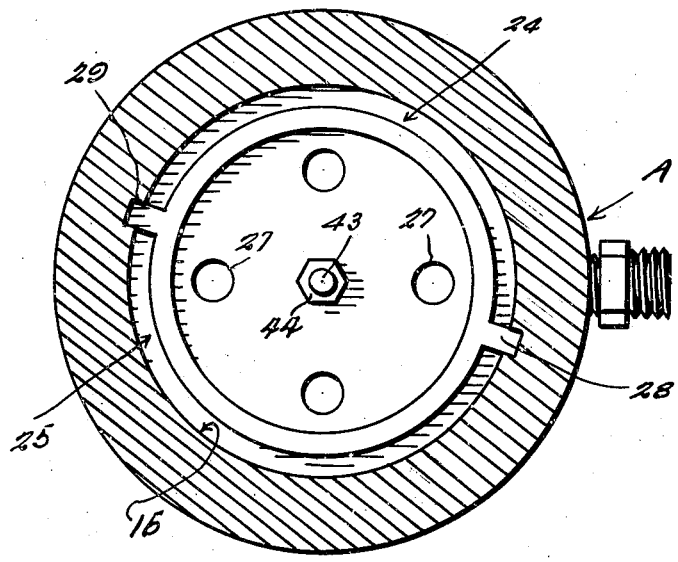
Figure 2 is a horizontal section on the plane of the line 2—2 of Figure 1, looking downwardly in the direction of the arrows.
Figure 3:
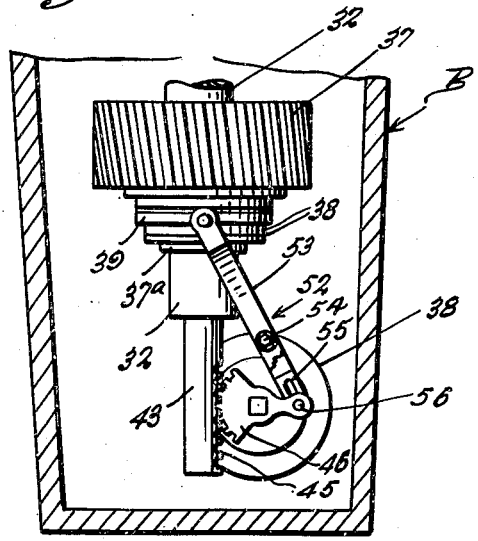
Figure 4:
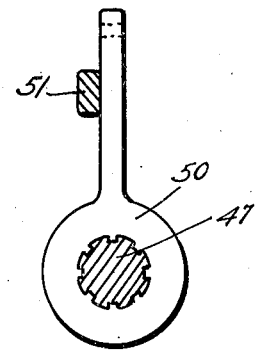

Figures 3 and 4 are vertical sections on the lines 3—3 and 4—4, respectively, of Figure 1.

Figures 5, 6 and 7 are diagrammatic views illustrating coordinating structural elements; namely, the fixed casing, the revoluble distributor and throttle control unit, respectively, this being a particular plan for a 9-cylinder radial-type engine.

Figure 8 is a detail view of a yoke-type adjusting link for one of the parts.

Figure 9 is a horizontal section showing the worm and worm gear motion transmitting means for the aforementioned revolving distributor.

Figure 10:
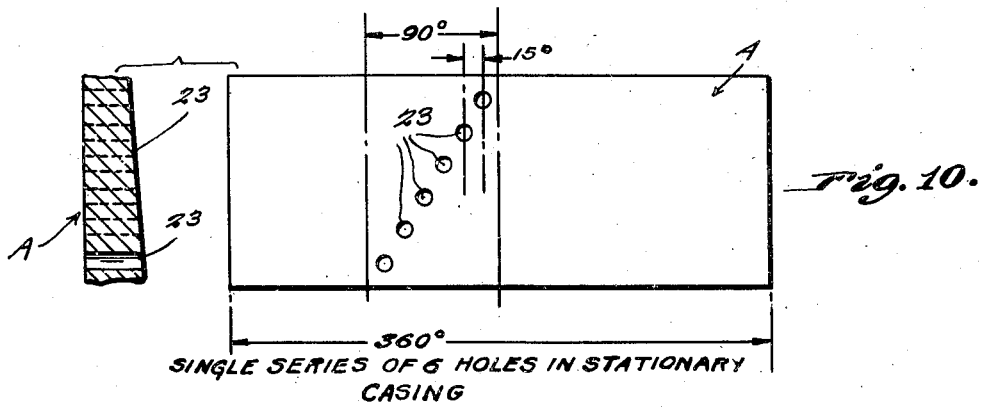
Figure 11:
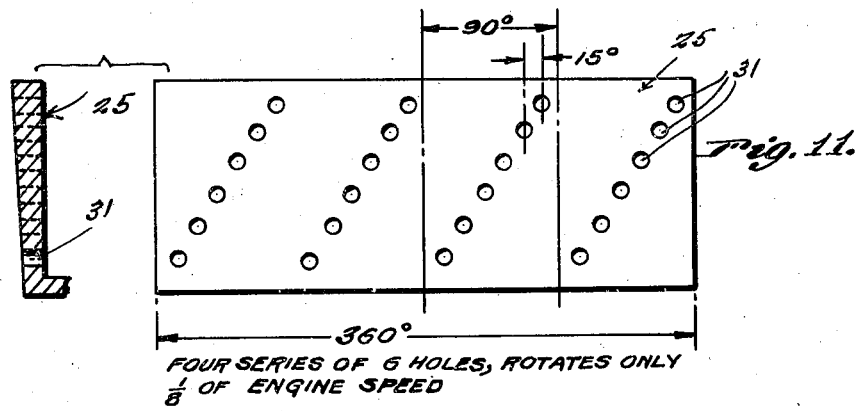
Figure 12:
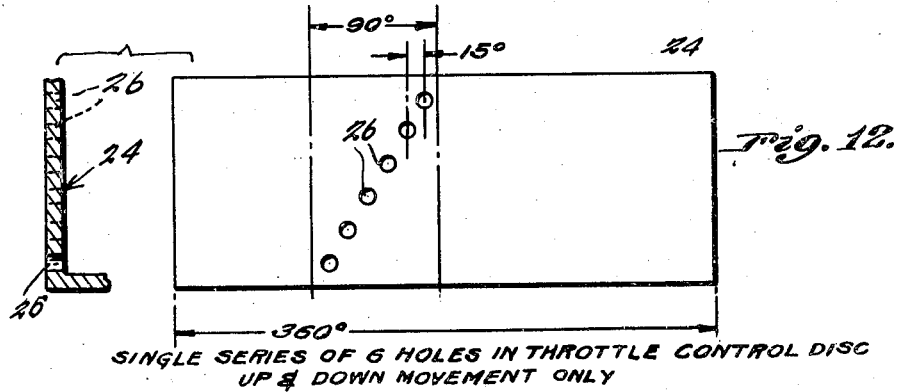

Figures 10, 11 and 12 represent a series of several views with associated off-side fragmentary sectional complements, representing what may be described as a plan for a 6-cylinder engine.

Briefly, and before setting forth with the detailed description, and by making casual study of the construction depicted in Figure 1, it will be seen that same has to do with a fuel metering and distributing valve which is characterized by a casing embodying a fuel inlet chamber for the intake of fuel which is delivered to the chamber under pressure, said casing having ports in its wall and the wall being relatively fixed, there being a ported throttle unit mounted for reciprocation in the chamber, a ported continuously rotated fuel metering and distributor unit interposed in substantially fuel tight relation between the fixed wall and the throttle unit with the porting in said distributor unit lying in the same plane as the porting in the fixed casing wall, the respective ports of said units coacting, upon reciprocation of said throttle unit and in relation to said distributor unit, worm and gear drive means being provided for continuously rotating the distributor unit along with separate manually regulated means for reciprocating the throttle unit whereby to thus provide a stationary casing wall, a continuously rotating distributor unit; and a reciprocatory throttling unit, all contributing their functions to the interception, metering and distribution of fuel to predetermined cylinders.

My novel periodic fuel valve with rotary distributor and reciprocal throttle is completely illustrated in Figure 1. It comprises an upper body A and a complemental depending gear housing B. The body A is in the form of a cylinder or casing having a removable dome-like cover 14 and a guide bearing 15. The cover constitutes a closure for what is hereinafter identified as the high pressure chamber 16. Fuel under pressure is delivered into this chamber by way of the side delivery pipe 17, this being provided with an automatic check valve 18. An excess fuel return line or pipe 19 is attached at one end to the fuel supply tank (not shown), the opposite end being connected through the medium of a suitable relief valve 20 to the dome-like cover 14. The depending shell forming the gear housing B defines a low pressure chamber 21, there being a by-pass 22 leading from the top of this chamber 21 back to the return pipe 19, as shown in dotted lines. This arrangement permits excess fuel in low pressure chamber to escape through by-pass 22 to return pipe 19. Incidentally, pressure in the chamber 16 is regulated to 10,000 pounds per square inch maximum and is variable to engine requirement by means of the adjustable relief valve 20. In order to lay the foundation for additional description and views of the drawings hereinafter referred to, particularly in a diagrammatic manner, it is to be observed that the wall of the cylindrical casing represents a relatively stationary part having fuel discharge outlets or ports 23 therein. Within the high pressure chamber 16 is a throttle control unit 24 and interposed between the wall of this and the wall of the casing is the associated revolving distributor unit 25. Structurally, both of these units 24 and 25 are of receptacle or cup-like form. The perpendicularly shiftable valving ports or apertures in the rim or wall of the reciprocal throttle control cup or unit are denoted by the numerals 26. The relatively large holes in the bottom of the cup, for venting purposes, are indicated at 27. At diametrically opposite points, the upper portion of the throttle wall is equipped with outstanding guide lugs 28 movable in guideways or grooves 29. The solid or non-apertured bottom of the coacting revoluble distributor unit 25 rests upon suitable anti-friction bearings and the upstanding marginal wall 30 is preferably tapered to correspond with the internal taper of the wall of the casing A. This wall 30 is provided with orifices or ports 31 coacting with the ports 23 and 26 in a manner to be more specifically described.

Attached to the bottom of the revolving distributor unit 25 is a depending sleeve 32 which extends downwardly through and beyond the guide bearing 15. Suitable roller bearing means 33 held in place by lock nuts 34 serve to coact with the parts 15 and 32 to provide for unhampered rotation of said sleeve. The lower end of the sleeve is provided with an elongated keyway 35 to accommodate a key 36 carried by the vertically shiftable or slidable gear 37. There is a collar 37a attached to the bottom of the gear and surrounding the sleeve, said collar being externally screw-threaded to accommodate the assembling and lock nuts 38 which hold in place the ball bearing unit 39. The gear 37 drives the sleeve and the sleeve drives the distributor cup 25. The gear 37 is actuated by a worm 40 on a suitably journaled, motion transmitting shaft 41 connected with the engine power. Incidentally, the numeral 42 designates a cover plate on the gear housing B to permit access to be had to the interior of said housing.

The sleeve 32 serves as a bearing for the reciprocatory shaft or pin 43, this being connected at its upper end, as at 44, to the center of the throttle control unit or cup 24. The lower end of the shaft, that is, the end projecting below the corresponding lower end of the sleeve 32, is provided with a rack 45 (see Fig. 3) with which the teeth of a gear segment 46 mesh. The gear segment is on the inner end of a rocker shaft 47 mounted for oscillation in a bearing 48, said bearing being provided with a stuffing box 49 (see Figure 1) outwardly of which is a rocker arm 50 coacting with a stop finger 51 on the casing B. In practice the rocker arm 50 connects, by appropriate means (not shown), with the engine throttle. Thus, the finger 51 is a throttle stop. Oscillation of the shaft 47 reciprocates the shaft 43 through the medium of the rack and gear 45 and 46, this to control the up-and-down valving action of the throttle control disc or unit 24.

Attention now comes to the hanger yoke or fixture 52 (see Figs. 1, 3 and 8). This is made up of complemental or companion sections 53 appropriately shaped and bolted together, as at 54, to facilitate assembling of the parts. The ears 55 have slidable bolt connection at 56 (see Fig. 3) with the extension or limb on the gear sector 46. The upper ends of the sections 53 are connected with the ball race 39, as brought out in Figures 1 and 3.

It is evident that Figure 1 serves to depict the complete assembled construction characterized essentially by the fuel pressure chamber 16 wherein a constant fuel pressure is maintained via the valved inlet 17, this from a suitable gear or plunger-type pump of conventional design (pumps not shown). It is evident that the cup-like, throttle control, disc or unit 24 regulates fuel flow to the engine, this by way of the valving ports 26 coacting with associated ports 31 and 23, respectively. The opening and closing of the throttle is accomplished by the up-and-down movement causing the ports 26 to coincide, or to fail to register, with distributor ports 31 in the revolving distributor unit 25.

It is to be noted that the revolving distributor base 25 is operatively connected with the upper end of the tubular shaft or sleeve 32 at the lower end of which is a milled keyway at proper angle to obtain desired advance or retard of the revolving distributor as it is driven by means of the gear 37 which is in turn driven by the worm and shaft 40 and 41, as disclosed. The yoke or lever mechanism 52 attached to the roller bearing collar at the base of the gear 37 and to the gear sector or segment 46 causes the driven gear 37 to rise or fall according to the throttle opening, thereby causing the distributor 25 to advance or retard in synchronization with proper injection relative to engine speed and load.

When the distributor valve action sets the fuel in communication with the injector, a sharp commencement of injection instantly becomes effective irrespective of the engine load and speed. When the fuel injection range has been accomplished, the sudden closing of the distributor ports causes an instant cut-off of all fuel pressure to the injector; pressure wave and afterdrip are thus eliminated.

The performance characteristics of such uniform high pressure will assure well atomized fuel and efficient combustion with clean exhaust. Uniformity of injection will assure each cylinder its rated amount of work, equal force applied to bearings and shafts, longer life, less vibration and higher thermal efficiency.

Automatic synchronization of injection by advancing or retarding injection range according to engine speed will result in a smoother running engine.

*Lubrication.*—The small percentage of fuel that escapes from the high pressure chamber down through central mechanism into low pressure chamber will be sufficient for lubrication.

*Air factor.*—All air that enters the high pressure chamber with the fuel will rise to the dome and discharge via the pressure relief valve 20 into the line 19 to the supply tank, where it will be liberated. It is not possible to air lock the system.

*Fuel return lines.*—Not required. The precise method of calibration and fuel metering eliminate injector fuel return lines.

*Design.*—The exterior surface of the wal 30 is tapered to give perfect seal; adjustment will take up all wear.

The metering apertures may be round, rectangular, square, triangular, semi-round, elliptical, or any combination of apertures in series to obtain desirable injection characteristics. A series of small holes properly spaced in the distributor disc equal in maximum capacity to a single large hole would result in a series of injections; a graduated series of holes, or a combination of hole sizes, could be utilized to control injection of fuel in exact amounts at exact instant required and thereby have positive control of ignition lag, pressure rise and mean effective pressure relative to most efficient combustion.

Maximum fuel delivery depends upon the pressure in the chamber 16 and the aperture in the distributor disc. This function is calculated at time of calibrating system for any particular type of engine; at no time should calibration exceed maximum fuel requirements for peak engine load.

Calibrator discs must of necessity vary in design and construction. A 9-cylinder, radial-type engine will require a revolving distributor disc in which four holes are drilled; each hole must be spaced at 90 degree intervals (if distributor disc turns at one-eighth engine speed) to inject fuel into each cylinder at 80 degree intervals.

In-line and V-type engines of various designs will require distributor discs of particular aperture arrangement, but in no case will the spirit of my invention be altered concerning the principle of calibration.

The fundamental principles of distributor and throttle control, briefly, are as follows: The ported wall of the casing A comprises a stationary part with a duly metered discharge port 23. The rotary, or relatively movable, wall with its port 31, that is, the wall of unit 25, coacts with the stationary wall first described, said wall revolving in a horizontal direction only. The remaining ported wall of the unit or throttle 24 shifts in a vertical direction only.

It is believed that the diagrammatic views, for exampe, Figures 5, 6 and 7, with legends and degree indications, when taken collectively and in conjunction with the pictorial portions of the drawings in the preceding description, will assist in obtaining a full appreciation of the merits of the invention. As previously indicated, these three views denote a fuel metering plan for a 9-cylinder, radial-type engine, for example, the type which is represented in the main drawing in Figure 1.

By the same token, Figures 10, 11 and 12, with the off-to-the-side sections which assist in understanding the views, should prove helpful in appreciating how the idea is projected for use in the fuel metering plan for 6-cylinder, V-type or in-line engines. It is understood that the dimensions and apportionment of coacting apertures and ports will vary according to prescribed engine requirements and construction.

A careful consideration of the foregoing description, in connection with the invention as illustrated in the drawings, will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departures are made from the invention as claimed.

I claim:

1. In a periodic valve in which delivered fuel is adjustably throttled, metered and distributed, a relatively fixed valve body open at its top and provided at its bottom with a bearing-equipped shaft guide, a closure for the open top of said body, said body being provided with a fuel inlet port and fuel discharge ports, a gear and mechanism housing connected to the bottom of the body and enclosing said shaft guide, said gear housing being provided at its bottom with a bearing, a rocker shaft mounted for oscillation in said bearing and having its inner end projecting into said housing, a cup-like fuel distributor device confined in said chamber and having its outstanding marginal wall provided with apertures intermittently registerable with the discharge ports in said body, a sleeve connected to the central bottom of said distributor and extending down through and beyond said shaft guide, a gear slidably splined on the projecting lower end portion of said sleeve and located in said gear housing, a worm shaft mounted for continuous rotation in the bearing in said housing and including a worm in mesh with said gear, said distributor device being mounted for continuous rotation in said chamber, a second cup-like throttling element mounted telescopically within the distributor device and having its bottom provided with vents, and its marginal wall provided with circumferentially spaced apertures registerable with the apertures inside the distributor, said cylindrical cup-like element last named constituting a throttle control, a shaft connected therewith and extending for reciprocation down through and beyond the lower end of said sleeve, the protruding lower end being provided with a rack, a gear segment on the afore-mentioned rocker shaft engageable with said rack, and a yoke swivelly connected with said gear, said yoke being operatively and adjustably connected with said gear segment.

2. A periodic valve in which delivered fuel is adjustably throttled, metered and distributed for separate conduction to a predetermined point of usage, a valve body having a fuel inlet chamber embodying wall means provided with a fixed intake port and a plurality of outlet ports, a distributor unit mounted for rotation in said chamber and having ports intermittently registerable with said outlet ports, means for continuously rotating said distributor unit in relation to said outlet ports, an incoming fuel throttling unit slidably keyed in said chamber, mated with, and reciprocable toward and from said first named unit and having ports co-acting with said distributor ports in a manner to vary the throttling relationship between the respective sets of ports when said throttling unit is reciprocated, and manually regulated means for reciprocating said throttling unit at the discretion and according to requirements of the user.

3. A periodic valve in which delivered fuel is adjustably throttled, metered and distributed for separate conduction to a predetermined point of usage, a valve body having a fuel inlet chamber embodying wall means provided with a fixed intake port and a plurality of fuel outlet ports, a distributor unit mounted for rotation in said chamber and having metered ports intermittently registerable with said outlet ports, worm and gear means for continuously rotating said distributor unit in relation to said outlet ports, an incoming fuel throttling unit slidably keyed in said chamber, mated with and reciprocable toward and from said first named unit and having ports co-acting with said metering ports in a manner to vary the throttling relationship between the respective sets of ports when said throttling unit is reciprocated, and manually regulated means for reciprocating said throttling unit at the discretion and according to requirements of the user.

4. A periodic valve in which delivered fuel is adjustably throttled, metered and distributed for separate conduction and delivery to a predetermined point for usage, a valve body having a fuel inlet chamber including wall means provided with a fixed intake port and a plurality of fixed fuel outlet ports, a distributor unit mounted for rotation in said chamber and having fuel metering ports intermittently registerable with said outlet ports, said unit being in the form of an apertured cup, worm and gear means for continuously rotating said discharge valve unit in relation to said outlet ports, an incoming fuel throttling unit in the form of a cup slidably keyed in said chamber, said second cup fitting telescopically into said first named cup, being reciprocable in relation thereto and having a plurality of ports adjustably cooperable with said metering ports in a manner to vary the throttling relationship between the respective ports when said throttling cup is reciprocated in relation to said first named cup.

5. A periodic valve in which delivered fuel is adjustably throttled, metered and distributed for separate conduction to a predetermined point for usage, a valve body having a fuel inlet chamber embodying wall means provided with a fixed intake port and a plurality of outlet ports, a distributor unit mounted for rotation in said chamber and having fuel metering ports intermittently registerable with said outlet ports, the lower portion of said valve body being provided with a guide, a sleeve connected to said valve unit and extending downwardly through and beyond said guide, means for continuously rotating said distributor unit by way of said sleeve, a fuel throttling unit slidably keyed in said chamber, mechanically mated with and reciprocable toward and from said first named unit and having ports co-acting with said metering ports in a manner to vary the throttling relationship between the respective ports when said throttling unit is reciprocated, a shaft connected to said throttling unit and extending downwardly through and beyond said sleeve, and manually regulated means for reciprocating said throttling unit, by way of said shaft, at the discretion and requirements of the user.

6. The structure specified in claim 5, in conjunction with a housing connected to said body and enclosing and completely covering said guide, sleeve, shaft, and means for rotating said sleeve in reciprocating said shaft.

7. A periodic rotary metering and distributing valve of the class shown and described comprising a valve body having a fuel inlet chamber embodying wall means provided with a fixed intake port and a plurality of outlet ports, a distributor unit mounted for rotation in said chamber and having fuel metering ports intermittently registerable with said outlet ports, the lower portion of said valve body being provided with a guide, a sleeve connected to said valve unit and extending downwardly through and beyond said guide, means for continuously rotating said distributor unit by way of said sleeve, a fuel throttling unit slidably keyed in said chamber, mechanically mated with and reciprocable toward and from said first named unit and having ports co-acting with said metering ports in a manner to vary the throttling relationship between the respective ports when said throttling unit is reciprocated, a shaft connected to said throttling unit and extending downwardly through and beyond said sleeve, and manually regulated means for reciprocating said throttling unit, by way of said shaft, at the discretion and requirements of the user, said first named means comprising a gear splined on said sleeve, and a worm in operating mesh with said gear.

8. In a periodic rotary metering and distributing valve of the class described, a fixed valve casing embodying a fuel inlet chamber for intake of fuel under pressure, said casing having a ported fixed wall, a ported throttle unit mounted for reciprocation in said chamber, and a ported continuously rotating fuel metering and distributor unit interposed in substantially fuel-tight relation between said fixed wall and throttle unit, the porting in said distributor unit lying in the same plane as the porting in said fixed casing, the respective ports of said units coacting upon reciprocation of said throttle unit in relation to said distributor unit, a worm and gear drive for continuously rotating said distributor unit, and separate manually regulated means for reciprocating the throttle unit, whereby to provide a stationary casing wall, a rotary continuously rotating distributor unit, and a reciprocatory throttling unit.

ROBERT W. WASHINGTON.

REFERENCES CITED

The following references are of record in the file of this patent:

UNITED STATES PATENTS

| Number | Name | Date |
| --- | --- | --- |
| 1,143,409 | Kyle | June 15, 1915 |
| 1,736,647 | Braren | Nov. 19, 1929 |
| 1,868,324 | Hughes | July 19, 1932 |
| 1,968,390 | Hamilton | July 31, 1934 |
| 2,024,690 | Harris | Dec. 17, 1935 |
| 2,025,362 | Starr | Dec. 24, 1935 |
| 2,027,360 | Alden | Jan. 14, 1936 |
| 2,273,019 | Butler | Feb. 17, 1942 |
| 2,331,580 | Strawn | Oct. 12, 1943 |

FOREIGN PATENTS

| Number | Country | Date |
| --- | --- | --- |
| 15,962 | Great Britain | 1913 |